United States Patent
Haugland

(10) Patent No.: US 7,027,926 B2
(45) Date of Patent: Apr. 11, 2006

(54) ENHANCED MEASUREMENT OF AZIMUTHAL DEPENDENCE OF SUBTERRANEAN PARAMETERS

(75) Inventor: Samuel Mark Haugland, Houston, TX (US)

(73) Assignee: PathFinder Energy Services, Inc., Houston, TX (US)

(*) Notice: Subject to any disclaimer, the term of this patent is extended or adjusted under 35 U.S.C. 154(b) by 109 days.

(21) Appl. No.: 10/827,134

(22) Filed: Apr. 19, 2004

(65) Prior Publication Data

US 2005/0234647 A1    Oct. 20, 2005

(51) Int. Cl.
*G01V 3/00* (2006.01)

(52) U.S. Cl. .............................. 702/9; 702/10

(58) Field of Classification Search ................ 702/6, 702/7, 8, 9, 10; 324/303, 338, 339, 343
See application file for complete search history.

(56) References Cited

U.S. PATENT DOCUMENTS

| | | | |
|---|---|---|---|
| 4,562,556 A | 12/1985 | Ingram et al. | |
| 4,642,648 A | 2/1987 | Hulland et al. | |
| 5,023,450 A | 6/1991 | Gold | |
| 5,045,795 A | 9/1991 | Gianzero et al. | |
| 5,184,079 A * | 2/1993 | Barber ...................... | 324/339 |
| 5,339,036 A | 8/1994 | Clark et al. | |
| 5,357,797 A | 10/1994 | Maki, Jr. et al. | |
| 5,422,480 A | 6/1995 | Schultz | |
| 5,461,562 A * | 10/1995 | Tabanou et al. ............. | 702/11 |
| 5,473,158 A | 12/1995 | Holenka et al. | |
| 5,486,695 A | 1/1996 | Schultz et al. | |
| 5,506,769 A | 4/1996 | Fu et al. | |
| 5,513,528 A | 5/1996 | Holenka et al. | |
| 5,591,967 A | 1/1997 | Moake | |
| 5,672,867 A | 9/1997 | Gadeken et al. | |
| 5,675,488 A | 10/1997 | McElhinney | |
| 5,680,906 A | 10/1997 | Andrieux et al. | |
| 5,899,958 A | 5/1999 | Dowell et al. | |
| 5,966,013 A | 10/1999 | Hagiwara | |
| 6,023,658 A | 2/2000 | Jeffryes | |
| 6,131,694 A | 10/2000 | Robbins et al. | |
| 6,307,199 B1 | 10/2001 | Edwards et al. | |
| 6,321,456 B1 | 11/2001 | McElhinnney | |
| 6,326,784 B1 * | 12/2001 | Ganesan et al. ............ | 324/303 |
| 6,510,106 B1 | 1/2003 | Hudson | |
| 6,584,837 B1 | 7/2003 | Kurkoski | |
| 6,619,395 B1 | 9/2003 | Spross | |

FOREIGN PATENT DOCUMENTS

| | | |
|---|---|---|
| EP | 0793000 | 4/2001 |
| GB | 2301438 | 4/1996 |

OTHER PUBLICATIONS

Oppenheim, A. V. and Schafer, R.W., Digital Signal Processing, Prentice-Hall, 1975, pp. pp. 239-250 and pp. 548-554.

* cited by examiner

Primary Examiner—Donald McElheny, Jr.

(57) ABSTRACT

A method for estimating an azimuthal dependence of a parameter of a borehole using logging sensor measurements acquired as a function of azimuth of the logging sensors is provided. The method includes acquiring at least one logging sensor measurement and a corresponding azimuth from a downhole tool. The method further includes processing a convolution of the logging sensor measurement and corresponding azimuth with a predetermined window function to determine convolved logging sensor data for at least one azimuthal position. Certain embodiments of this invention may be advantageously utilized in LWD imaging applications to provide for superior image resolution and noise rejection as compared to prior art imaging techniques.

38 Claims, 2 Drawing Sheets

ENHANCED MEASUREMENT OF AZIMUTHAL DEPENDENCE OF SUBTERRANEAN PARAMETERS

FIELD OF THE INVENTION

The present invention relates generally to a method for logging a subterranean borehole. More specifically, this invention relates to processing measured data regarding a subterranean parameter where the result more faithfully represents the azimuthal dependence of the data. Subterranean depth data may then be associated therewith, for example, so as to enable imaging. Embodiments of this invention advantageously reduce image distortion caused by statistical measurement noise and aliasing effects as compared to the prior art.

BACKGROUND OF THE INVENTION

Logging techniques for determining numerous borehole and formation characteristics are well known in oil drilling and production applications. Such logging techniques include, for example, natural gamma ray, spectral density, neutron density, inductive and galvanic resistivity, acoustic velocity, acoustic caliper, downhole pressure, and the like. In conventional wireline logging applications, a probe having various sensors is lowered into a borehole after the drill string and bottom hole assembly (BHA) have been removed. Various parameters of the borehole and formation are measured and correlated with the longitudinal position of the probe as it is pulled uphole. More recently, the development of logging while drilling (LWD) applications has enabled the measurement of such borehole and formation parameters to be conducted during the drilling process. The measurement of borehole and formation properties during drilling has been shown to improve the timeliness and quality of the measurement data and to often increase the efficiency of drilling operations.

LWD tools are often used to measure physical properties of the formations through which a borehole traverses. Formations having recoverable hydrocarbons typically include certain well-known physical properties, for example, resistivity, porosity (density), and acoustic velocity values in a certain range. Such LWD measurements may be used, for example, in making steering decisions for subsequent drilling of the borehole. For example, an essentially horizontal section of a borehole may be routed through a thin oil bearing layer (sometimes referred to in the art as a payzone). Due to the dips and faults that may occur in the various layers that make up the strata, the drill bit may sporadically exit the oil-bearing layer and enter nonproductive zones during drilling. In attempting to steer the drill bit back into the oil-bearing layer (or to prevent the drill bit from exiting the oil-bearing layer), an operator typically needs to know in which direction to turn the drill bit (e.g., up, down, left, or right). In order to make correct steering decisions, information about the strata, such as the dip and strike angles of the boundaries of the oil-bearing layer is generally required. Such information may possibly be obtained from azimuthally sensitive measurements of the formation properties and, in particular, from images derived from such azimuthally sensitive measurements.

Downhole imaging tools are conventional in wireline applications. Such wireline tools typically create images by sending large quantities of azimuthally sensitive logging data uphole via a high-speed data link (e.g., a cable). Further, such wireline tools are typically stabilized and centralized in the borehole and include multiple (often times six or more) sensors (e.g., gamma ray sensors) extending outward from the tool into contact (or near contact) with the borehole wall. It will be appreciated by those of ordinary skill in the art that such wireline arrangements are not suitable for typical LWD applications. In particular, communication bandwidth with the surface would typically be insufficient during LWD operations (e.g., via known mud pulse telemetry techniques) to carry large amounts of image-related data. Further, LWD tools are generally not centralized or stabilized during operation and thus require more rugged sensor arrangements.

Several attempts have been made to develop LWD tools and methods that may be used to provide images of various azimuthally sensitive sensor measurements related to borehole and/or formation properties. Many such attempts have made use of the rotation (turning) of the BHA (and therefore the LWD sensors) during drilling of the borehole. For example, Holenka et al., in U.S. Pat. No. 5,473,158, discloses a method in which sensor data (e.g., neutron count rate) is grouped by quadrant about the circumference of the borehole. Likewise, Edwards et al., in U.S. Pat. No. 6,307,199, Kurkoski, in U.S. Pat. No. 6,584,837, and Spross, in U.S. Pat. No. 6,619,395, disclose similar methods. For example, Kurkoski discloses a method for obtaining a binned azimuthal density of the formation. In the disclosed method, gamma ray counts are grouped into azimuthal sectors (bins) typically covering 45 degrees in azimuth. Accordingly, a first sector may include data collected when the sensor is positioned at an azimuth in the range from about 0 to about 45 degrees, a second sector may include data collected when the sensor is positioned at an azimuth in the range from about 45 to about 90 degrees, and so on.

As described above, one problem with implementing LWD imaging techniques is that imaging techniques, in general, typically require large data storage and/or data transmission capacity. Due to the limited conventional communication bandwidth between a BHA and the surface, as well as limited conventional downhole data storage capacity, the sensor data used to form the images must typically undergo significant quantity reduction. Conventional techniques as described above accomplish such data quantity reduction via "binning" sensor data into a plurality of azimuthal sectors (also referred to bins or azimuthal bins). While binning techniques have been utilized in commercial LWD applications, both real-time and memory LWD images are often coarse or grainy (and therefore of poor quality) and in need of improvement. Such binning techniques may therefore not always be the most optimal approach to forming LWD images.

It will therefore be appreciated that there exists a need for improved methods for forming LWD images from azimuthally sensitive sensor data. Such methods may, for example, improve image quality (as compared to the prior art) while not significantly increasing communication bandwidth and/or downhole data storage capacity requirements.

SUMMARY OF THE INVENTION

The present invention addresses one or more of the above-described drawbacks of prior art borehole imaging techniques. Referring briefly to the accompanying figures, aspects of this invention include a method for forming a borehole image of an azimuthally sensitive formation (or borehole) parameter. Such a borehole image may be formed, for example, by convolving logging sensor data acquired as a function of logging sensor azimuth with a window function. In one embodiment, the logging sensor data and the corresponding azimuths are measured during drilling of a borehole while a LWD tool rotates with the drill string in the borehole. The convolution is typically evaluated at one or more azimuthal positions about a circular horizon. The convolved logging sensor data may then be associated with subterranean depth, for example, to enable imaging.

Exemplary embodiments of the present invention may advantageously provide several technical advantages. For example, exemplary methods according to this invention provide for superior image resolution and noise rejection as compared to prior art techniques such as binning. In particular, exemplary embodiments of this invention enable aliasing effects to be decoupled from statistical measurement noise, which tends to improve the usefulness of the borehole images in determining the actual azimuthal dependence of the formation parameter of interest. Moreover, certain embodiments of this invention may be advantageously utilized in LWD imaging applications.

In one aspect the present invention includes a method for estimating an azimuthal dependence of a parameter of a borehole using logging sensor measurements acquired as a function of azimuth of said logging sensors. The method includes rotating a downhole tool in a borehole, the tool including at least one logging sensor and at least one azimuth sensor. Data from the logging sensor is operable to assist determination of a parameter of the borehole. The method further includes causing the at least one logging sensor and the at least one azimuth sensor to acquire at least one data pair, each data pair including a logging sensor measurement and a corresponding azimuth. The method further includes processing a convolution of selected data pairs with a predetermined window function to determine convolved logging sensor data for at least one azimuthal position. In one exemplary embodiment, the convolved logging sensor data may be associated with subterranean depth to enabling imaging of the borehole parameter.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
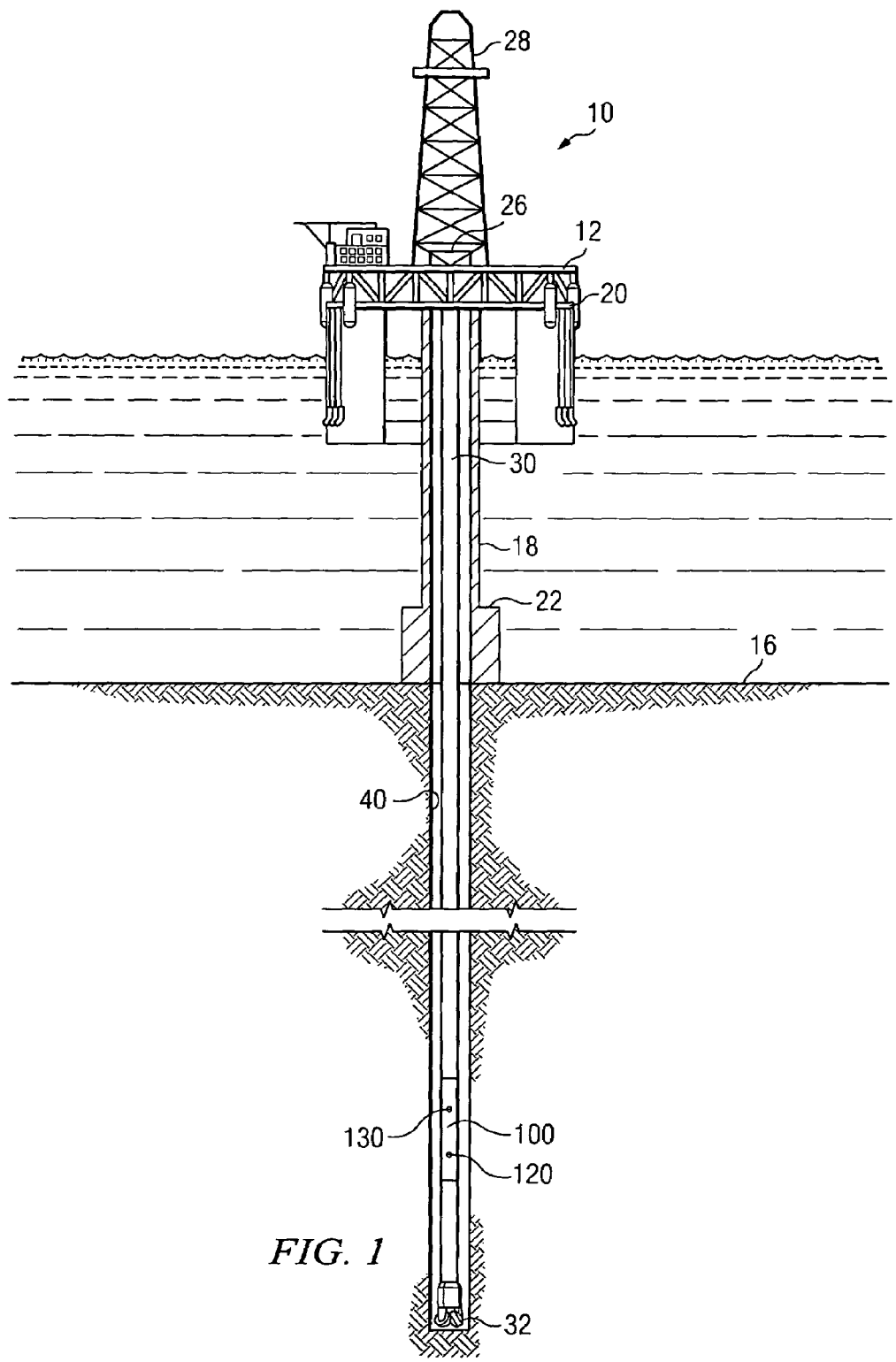
FIG. 1 depicts one exemplary LWD tool suitable for use in accordance with aspects of this invention.

FIG. 1 schematically illustrates one exemplary embodiment of a logging while drilling tool 100 according to this invention in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and LWD tool 100. LWD tool 100 typically includes at least one LWD sensor 120 and an azimuth sensor 130 deployed thereon. LWD sensor 120 may include substantially any downhole logging sensor, for example, including a natural gamma ray sensor, a neutron sensor, a density sensor, a resistivity sensor, a formation pressure sensor, an annular pressure sensor, an ultrasonic sensor, an audio-frequency acoustic sensor, and the like. Azimuth sensor 130 may include substantially any sensor that is sensitive to its azimuth on the tool (e.g., relative to high side), such as one or more accelerometers and/or magnetometers. Drill string 30 on FIG. 1 may further include a downhole drill motor, a mud pulse telemetry system for communicating with the surface, and other logging and/or measurement while drilling tools, such as surveying tools, formation sampling tools, drill string steering tools, and the like.

It will be understood by those of ordinary skill in the art that the LWD tool 100 of the present invention is not limited to use with a semisubmersible platform 12 as illustrated in FIG. 1. LWD tool 100 is equally well suited for use with any kind of subterranean drilling operation, either offshore or onshore.

In the embodiment shown in FIG. 1, the LWD sensor 120 and the azimuth sensor 130 are longitudinally spaced and deployed at substantially the same azimuthal (circumferential) position on the tool 100. It will be appreciated that this invention is not limited to any particular layout (positioning) of the LWD sensor 120 and the azimuth sensor 130 on the tool 100. For example, in an alternative embodiment (not shown) the LWD and azimuth sensors may be deployed at substantially the same longitudinal position, but be circumferentially offset from one another. It will also be appreciated that while the embodiment shown on FIG. 1 includes a single LWD sensor 120 and a single azimuth sensor 130, that this invention is not limited to any particular number of LWD and azimuth sensors.

LWD tool 100 may further optionally include an energy source (not shown). For example, an LWD tool configured for azimuthal gamma measurements may include a gamma radiation source (such a device is typically referred to as a density measurement device). Likewise, LWD tools configured for azimuthal resistivity and acoustic velocity measurements may include one or more electromagnetic wave generators and acoustic transmitters, respectively. The invention is not limited, however, to the use of an energy source since the LWD sensor 120 may be utilized to measure naturally occurring formation parameters (e.g., a natural gamma ray sensor may be utilized to measure azimuthally sensitive natural gamma ray emissions).

With continued reference to FIG. 1, downhole tool 100 typically further includes a controller (not shown), e.g., having a programmable processor (not shown), such as a microprocessor or a microcontroller and processor-readable or computer-readable program code embodying logic. A suitable processor may be utilized, for example, to construct images (as described in more detail below) of the subterranean formation based on azimuthally sensitive sensor measurements and associated azimuth and measured depth information. Images of the earth formation may indicate physical properties (e.g., resistivity, dielectric constant, acoustic velocity, density, etc.) of the surrounding formation and/or the materials comprising the strata. A suitable controller may also optionally include other controllable components, such as sensors (e.g., a depth sensor), data storage devices, power supplies, timers, and the like. The controller may also be disposed to be in electronic communication with sensors 120 and 130. A suitable controller may also optionally communicate with other instruments in the drill string, such as, for example, telemetry systems that communicate with the surface. A typical controller may further optionally include volatile or non-volatile memory or a data storage device.

Figure 2:
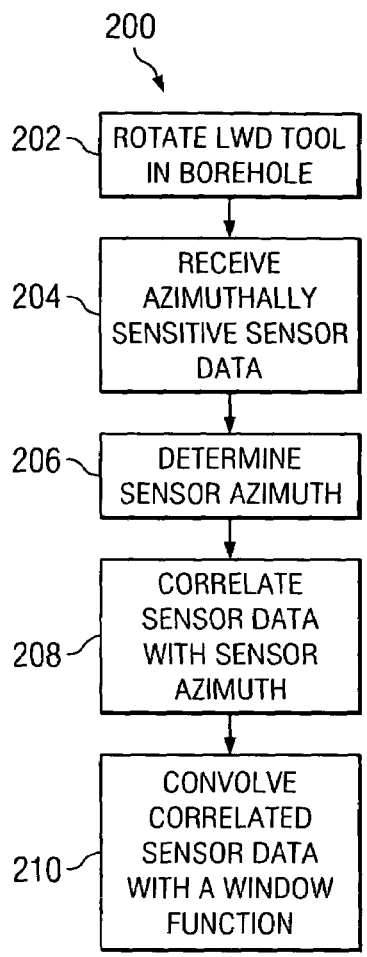
FIG. 2 depicts a flowchart of one exemplary method embodiment of this invention.

Turning now to FIG. 2, one exemplary embodiment of a method 200 according to this invention is illustrated. LWD tool 100 rotates 202 with the drill string in the borehole (e.g., with drill string 30 in borehole 42 shown on FIG. 1). Logging data 204 and azimuth data 206 are measured by LWD sensor 120 and azimuth sensor 130 (FIG. 1), respectively, during rotation of the tool 100. The logging and azimuth data may be correlated 208 such that each data point in the sequence of logging data points is assigned an azimuth. The correlated data may then be convolved 210 with a predetermined window function (such as a Bartlett function as described in more detail below) at a plurality of azimuthal positions about the circumference of the tool and the result transmitted to the surface and/or stored in memory. As described in more detail below, convolution with a window function enables the sensor data to be, for example, over sampled and/or weighted based on its associated azimuth. Such convolution thus tends to advantageously improve image quality via reducing statistical measurement noise and image distortion (as compared to prior art binning techniques).

In general an image may be thought of as a two-dimensional representation of a parameter value determined at discrete positions. For the purposes of this disclosure, borehole imaging may be thought of as a two-dimensional representation of a measured formation (or borehole) parameter at discrete azimuths and borehole depths. Such borehole images thus convey the dependence of the measured formation (or borehole) parameter on the borehole azimuth and depth. It will therefore be appreciated that one purpose in forming such images of particular formation or borehole parameters (e.g., formation resistivity, dielectric constant, density, acoustic velocity, etc.) is to determine the actual azimuthal dependence of such parameters as a function of the borehole depth. Determination of the actual azimuthal dependence may enable a value of the formation parameter to be determined at substantially any arbitrary azimuth, for example via interpolation. The extent to which a measured image differs from the actual azimuthal dependence of a formation parameter may be thought of as image distortion. Such distortion may be related, for example, to statistical measurement noise and/or other effects, such as aliasing. Nevertheless, it will be appreciated that minimizing image distortion advantageously improves the usefulness of borehole images in determining the actual azimuthal dependence of such borehole parameters.

Figure 3:
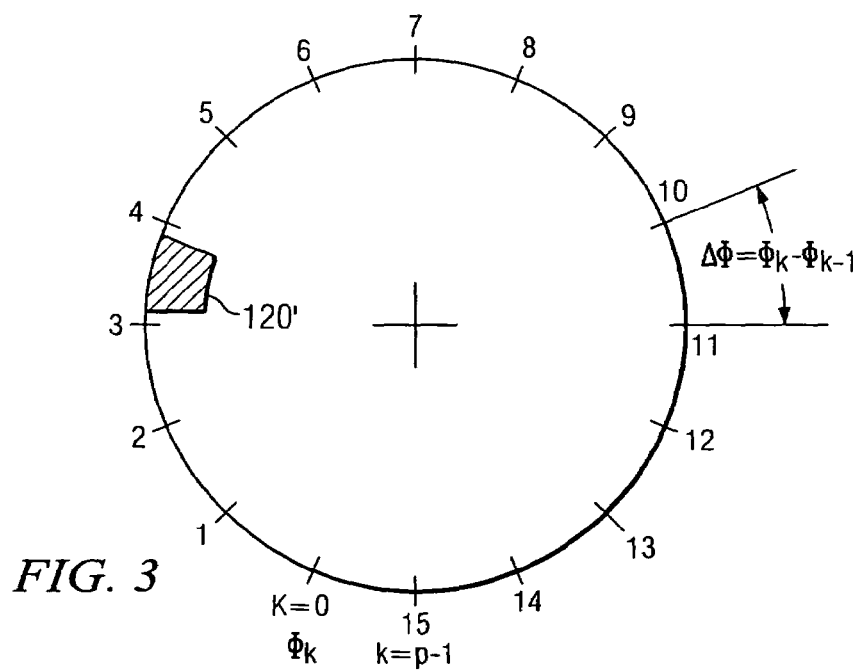
FIG. 3 depicts in schematic form a cross section of an exemplary LWD tool suitable for use in accordance with aspects of this invention.

With reference now to FIG. 3, a schematic of a cross section of a downhole tool (e.g., tool 100 shown on FIG. 1) is shown. The tool includes a sensor 120' (such as a gamma ray sensor) deployed thereon. In general, the borehole (or the circumference of the tool) may be represented by a plurality of discrete azimuthal positions. Typically, embodiments including 8 to 32 azimuthal positions are preferred (the embodiment shown in FIG. 3 includes 16 discrete azimuthal positions denoted as 0 through 15). However, the invention is not limited in this regard, as substantially any number of discrete azimuthal positions may be utilized. It will be appreciated that there is a tradeoff with increasing the number of azimuthal positions. Image quality (and in particular azimuthal resolution) tends to improve with increasing number of azimuthal positions at the expense of requiring greater communication bandwidth between the downhole tool and the surface and/or greater data storage capacity. Furthermore, conventional binning techniques may lead to a degradation of the statistical properties of the binned data as the number of azimuthal positions increases. The prior art is characterized by a tradeoff between the number of azimuthal positions and the statistical variations available among the measured logging data.

With continued reference to FIG. 3, and assuming that the azimuthal positions are uniformly distributed about the circumference of the tool, the azimuth at each discrete azimuthal position, $\phi_k$, and the subtended circular angle between adjacent azimuthal positions, $\Delta\phi$, may be expressed mathematically, for example, as follows:

$$\phi_k = \frac{2\pi}{p}k + \pi\left(\frac{2}{p} - 1\right), k = 0, \ldots, p-1 \qquad \text{Equation 1}$$

$$\Delta\phi = \phi_k - \phi_{k-1} = \frac{2\pi}{p} \qquad \text{Equation 2}$$

where the subscript k is used to represent the individual azimuthal positions and p represents the number of azimuthal positions about the circumference of the tool. While the above equations assume that the azimuthal positions are evenly distributed about the circumference of the tool, the invention is not limited in this regard. For example, if a heterogeneity in a formation is expected on one side of a borehole (e.g., from previous knowledge of the strata), the azimuthal positions may be chosen such that $\Delta\phi$ on that side of the tool is less than $\Delta\phi$ on the opposing side of the tool.

As described briefly above, exemplary embodiments of this invention include convolving azimuthally sensitive sensor data with a predetermined window function. The azimuthal dependence of a measurement sensitive to a formation parameter may be represented by a Fourier series, for example, shown mathematically as follows:

$$F(\phi) = \sum_{v=-\infty}^{+\infty} f_v \exp(iv\phi) \qquad \text{Equation 3}$$

where the Fourier coefficients, $f_v$, are expressed as follows:

$$f_v = \frac{1}{2\pi}\int_{-\pi}^{\pi} F(\phi)\exp(-iv\phi)\,d\phi \qquad \text{Equation 4}$$

and where $\phi$ represents the azimuth about the circumference of the tool, $F(\phi)$ represents the azimuthal dependence of a measurement sensitive to a formation (or borehole) parameter, and i represents the square root of the integer −1.

Given a standard mathematical definition of a convolution, the convolution of the sensor data with a window function may be expressed as follows:

$$\tilde{F}_k = \tilde{F}(\phi_k) = \frac{1}{2\pi}\int_{-\pi}^{+\pi} F(\phi)W(\phi_k - \phi)\,d\phi \qquad \text{Equation 5}$$

where $\phi$ and $F(\phi)$ are defined above with respect Equation 4, $\tilde{F}_k$ and $\tilde{F}(\phi_k)$ represent the convolved sensor data stored at each discrete azimuthal position, and $W(\phi_k-\phi)$ represents the value of the predetermined window function at each discrete azimuthal position, $\phi_k$, for a given azimuth, $\phi$. For simplicity of explanation of this embodiment, the window function itself is taken to be a periodic function such that $W(\phi)=W(\phi+2\pi l)$ where $l= \ldots, -1, 0, +1, \ldots$, is any integer. However, it will be appreciated that use of periodic window functions is used here for illustrative purposes, and that the invention is not limited in this regard.

Based on Equations 3 through 5, it follows that:

$$\tilde{F}_k = \sum_{v=-\infty}^{+\infty} f_v w_v \exp(iv\phi_k), \; k = 0, \ldots, p-1 \qquad \text{Equation 6}$$

where from Equation 2:

$$w_v = \frac{1}{2\pi}\int_{-\pi}^{+\pi} W(\phi)\exp(-iv\phi)\,d\phi \qquad \text{Equation 7}$$

where $w_v$ represents the Fourier coefficients of $W(\phi)$, $f_v$ represents the Fourier coefficients of $F(\phi)$ and is given in Equation 4, $W(\phi)$ represents the azimuthal dependence of the window function, and, as described above, $F(\phi)$ represents the azimuthal dependence of the measurement that is sensitive to the formation parameter. It will be appreciated that the form of Equation 6 is consistent with the mathematical definition of a convolution in that the Fourier coefficients for a convolution of two functions equal the product of the Fourier coefficients for the individual functions.

It will be appreciated that embodiments of this invention may utilize substantially any window function, $W(\phi)$. Suitable window functions typically include predetermined values that are expressed as a function of the angular difference between the discrete azimuthal positions, $\phi_k$, and an arbitrary azimuth, $\phi$. For example, in one exemplary embodiment, the value of the window function is defined to be a constant within a range of azimuth angles (i.e., a window) and zero outside the range. Such a window function is referred to as a rectangular window function and may be expressed, for example, as follows:

$$W(\phi) = \begin{cases} 2\pi p, & |\phi| < \frac{x\pi}{p} \\ 0, & \frac{x\pi}{p} \le \phi < \pi \\ 0, & -\pi \le \phi \le -\frac{x\pi}{p} \end{cases} \qquad \text{Equation 8}$$

where p represents the number of azimuthal positions for which convolved logging sensor data is determined, $\phi$ represents azimuth, and x is a factor controlling the azimuthal breadth of the window function $W(\phi)$. While Equation 8 is defined over the interval $-\pi \le \phi < \pi$, it is understood that $W(\phi)$ has the further property that it is periodic: $W(\phi)=W(\phi+2\pi l)$ for any integer l.

Figure 4:
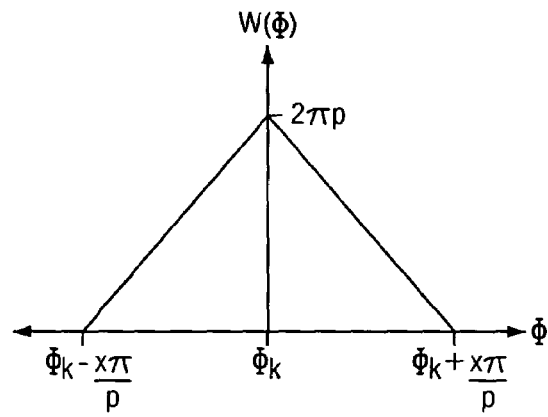
FIG. 4 depicts an exemplary Bartlett window function.

In certain embodiments it may be advantageous to utilize tapered and/or symmetrical window functions. A Bartlett function (i.e., a triangle function), such as that shown on FIG. 4, is one example of a symmetrical and tapered window function that is relatively simple and thus a good choice for illustrating exemplary advantages of this invention. As shown in FIG. 4 and as used herein, a symmetrical window function is one in which the value of the window function is an even function of its argument. A tapered window function is one in which the value of the window function decreases with increasing angular difference, $|\phi_k-\phi|$, between a discrete azimuthal position, $\phi_k$, and an azimuth, $\phi$. It will be appreciated that such tapered window functions tend to weight the measured sensor data based on its corresponding azimuth, with sensor data acquired at or near an azimuth of $\phi_k$ being weighted more heavily than sensor data acquired at an azimuth further away from $\phi_k$. Setting $\phi_k=0$, one exemplary Bartlett window function may be expressed, for example, as follows:

$$W(\phi) = \begin{cases} 2\pi p\left(1 - \frac{p|\phi|}{x\pi}\right), & |\phi| < \frac{x\pi}{p} \\ 0, & \frac{x\pi}{p} \le \phi < \pi \\ 0, & -\pi \le \phi \le -\frac{x\pi}{p} \end{cases} \qquad \text{Equation 9}$$

where p, $\phi$, and x are as described above with respect to Equation 8. In Equation 9, $W(\phi)$ has the same exemplary periodicity mentioned in the discussion of Equation 8.

In addition to the Bartlett function described above, other exemplary symmetrical and tapered window functions include, for example, Blackman, Gaussian, Hanning, Hamming, and Kaiser functions, exemplary embodiments of which are expressed mathematically as follows in Equations 10, 11, 12, 13, and 14, respectively:

$$W(\phi) = \begin{cases} 2\pi p\left[0.42 + 0.5\cos\left(\frac{p\phi}{x}\right) + 0.08\cos\left(2\frac{p\phi}{x}\right)\right], & |\phi| < \frac{x\pi}{p} \\ 0, & \frac{x\pi}{p} \le \phi < \pi \\ 0, & -\pi \le \phi \le -\frac{x\pi}{p} \end{cases} \qquad \text{Equation 10}$$

$$W(\phi) = \begin{cases} \exp\left(-\alpha_a\left(\frac{p\phi}{x\pi}\right)^2\right), & |\phi| < \frac{x\pi}{p} \\ 0, & \frac{x\pi}{p} \le \phi < \pi \\ 0, & -\pi \le \phi \le -\frac{x\pi}{p} \end{cases} \qquad \text{Equation 11}$$

$$W(\phi) = \begin{cases} \pi p\left(1 + \cos\left(\frac{p\phi}{x}\right)\right), & |\phi| < \frac{x\pi}{p} \\ 0, & \frac{x\pi}{p} \le \phi < \pi \\ 0, & -\pi \le \phi \le -\frac{x\pi}{p} \end{cases} \qquad \text{Equation 12}$$

-continued $$W(\phi) = \begin{cases} 2\pi p\left[0.54 + 0.46\cos\left(\frac{p\phi}{x}\right)\right], & |\phi| < \frac{x\pi}{p} \\ 0, & \frac{x\pi}{p} \le \phi < \pi \\ 0, & -\pi \le \phi \le -\frac{x\pi}{p} \end{cases} \quad \text{Equation 13}$$

$$W(\phi) = \begin{cases} \dfrac{I_0\left(\omega_a\sqrt{1-\left(\frac{p\phi}{x\pi}\right)^2}\right)}{I_0(\omega_a)}, & |\phi| < \frac{x\pi}{p} \\ 0, & \frac{x\pi}{p} \le \phi < \pi \\ 0, & -\pi \le \phi \le -\frac{x\pi}{p} \end{cases} \quad \text{Equation 14}$$

where p, x, and $\phi$ are as described above with respect to Equation 8, and $\alpha_a$ represents another factor selected to control the relative breadth of the window function, such as, for example, the standard deviation of a Gaussian window function. Typically, $\alpha_a$ is in the range from about 1 to about 2. $I_0$ represents a zero order modified Bessel function of the first kind and $\omega_a$ represents a further parameter that may be adjusted to control the breadth of the window. Typically, $\omega_a$ is in the range from about $\pi$ to about $2\pi$. It will be appreciated that Equations 8 through 14 are expressed independent of $\phi_k$ (i.e., assuming $\phi_k$=0) for clarity. Those of ordinary skill in the art will readily recognize that such equations may be rewritten in numerous equivalent or similar forms to include non zero values for $\phi_k$. In Equations 10–14, all the functions W($\phi$) also have the same exemplary periodicity mentioned in the discussion of Equations 8 and 9.

In one exemplary serviceable embodiment of this invention, an energy source (e.g., a gamma radiation source) emits energy radially outward and in a sweeping fashion about the borehole as the tool rotates therein. Some of the gamma radiation from the source interacts with the formation and is detected at a gamma ray detector within the borehole. Typically the detector is also rotating with the tool. The sensor may be configured, for example, to average the detected radiation (the azimuthally sensitive sensor data) into a plurality of data packets, each acquired during a single rapid sampling period. The duration of each sampling period is preferably significantly less than the period of the tool rotation in the borehole (e.g., the sampling period may be about 10 milliseconds while the rotational period of the tool may be about 0.5 seconds). Meanwhile, the azimuth sensor measures the azimuth of the tool, and correspondingly the gamma ray sensor, as the tool rotates in the borehole. An azimuth is then assigned to each data packet. The azimuth is preferably measured for each sampling period, or often enough so that the azimuth of the tool may be determined for each sampling period, although the invention is not limited in this regard. In one exemplary embodiment, the assigned azimuth may be expressed mathematically, for example, as follows:

$$\gamma_j = \phi(t_j) - \left(\frac{\phi(t_j) - \phi(t_{j-1}) - 2\pi c_j}{2}\right) + 2\pi b_j \quad \text{Equation 15}$$

where $\gamma_j$ represents the assigned azimuth and $\phi(t_j)$ and $\phi(t_{j-1})$ represent the sensor azimuth at times $t_j$ and $t_{j-1}$, respectively. Additionally, a rapid data-sampling period, $\Delta t_j$, equals $t_j - t_{j-1}$. Equation 15, as written, uses the convention that $-\pi < \phi(t_j) \le \pi$. Thus, $c_j$ equals zero if $\phi(t_j)$ and $\phi(t_{j-1})$ have the same sign, otherwise, $c_j$ equals +1 if $\phi(t_j) \ge 0$ and $c_j$ equals −1 if $\phi(t_j) < 0$. The constant $b_j = \pm 1$ in Equation 15 is selected to ensure that $-\pi < \gamma_j \le \pi$. It will be appreciated that the invention is not limited in this regard and that Equation 15 could be rewritten using substantially any other convention.

The contribution of each data packet to the convolved sensor data given in Equation 5 may then be expressed as follows:

$$\frac{1}{2\pi} F(\gamma_j) W(\phi_k - \gamma_j), k = 0, \ldots, p-1 \quad \text{Equation 16}$$

where $F(\gamma_j)$ represents the measured sensor data at azimuth $\gamma_j$ and as described above $W(\phi_k - \gamma_j)$ represents the value of the predetermined window function at each assigned azimuth $\gamma_j$.

Sensor data for determining the azimuthal dependence of the formation parameter (e.g., formation density) at a particular well depth is typically gathered and grouped during a predetermined time period. The predetermined time period is typically significantly longer (e.g., one thousand times) than the above described rapid sampling time. Summing the contributions to Equation 16 from N such data packets yields:

$$\tilde{F}_k = \frac{1}{2\pi N} \sum_{j=1}^{N} F(\gamma_j) W(\phi_k - \gamma_j), k = 0, \ldots, p-1 \quad \text{Equation 17}$$

where $\tilde{F}_k$ represents the convolved sensor data stored at each discrete azimuthal position as described above with respect to Equation 5. The sum is normalized by the factor 1/N so that the value of $\tilde{F}_k$ is independent of N in the large N limit.

In the exemplary embodiment described, $\tilde{F}_k$, as given in Equation 17, represents the convolved sensor data for a single well depth. To form a two dimensional image (azimuthal position versus well depth), sensor data may be acquired at a plurality of well depths using the procedure described above. In one exemplary embodiment, sensor data may be acquired substantially continuously during at least a portion of a drilling operation. Sensor data may be grouped by time (e.g., in 10 second intervals) with each group indicative of a single well depth. In one exemplary embodiment, each data packet may be acquired in about 10 milliseconds. Such data packets may be grouped in about 10 second intervals resulting in about 1000 data packets per group. At a drilling rate of about 60 feet per hour, each group represents about a two-inch depth interval. It will be appreciated that this invention is not limited to any particular rapid sampling and/or time periods. Nor is this invention limited by the description of the above exemplary embodiments.

It will also be appreciated that embodiments of this invention may be utilized in combination with substantially any other known methods for correlating the above described time dependent sensor data with depth values of a borehole. For example, the $\tilde{F}_k$ values obtained in Equation 17 may be tagged with a depth value using known techniques used to tag other LWD data. The $\tilde{F}_k$ values may then be plotted as a function of azimuthal position and depth to generate an image.

Comparison with Prior Art Binning Techniques

As described above, one objective of azimuthal imaging is the determination of the actual azimuthal dependence F(φ) of a measurement that is sensitive to a formation (or borehole) parameter. In the discussion that follows it will be shown that exemplary embodiments of this invention reduce statistical measurement noise and image distortion effects as compared to prior art binning techniques. Embodiments of this invention thus advantageously tend to produce superior images as compared to the prior art.

As described above, the prior art discloses methods for binning sensor data in a range of anywhere from about four (quadrants) to about 16 azimuthal sectors. As the tool rotates about its longitudinal axis, data are acquired by a sensor and grouped into various sectors based on the azimuth of the sensor. During subsequent revolutions sensor data grouped into any particular sector is essentially averaged with sensor data acquired during previous revolutions. Prior art methods further assume that the azimuthal sectors do not overlap one another and are essentially the same size (e.g., eight sectors each subtending an arc of 45 degrees). Based on such prior art binning techniques, an azimuthal angle, $\phi_s$, and the subtended circular angle, $\Delta\phi$, of each azimuthal sector may be expressed mathematically, for example, as follows:

$$\phi_s = \frac{2\pi}{n}s + \pi\left(\frac{2}{n} - 1\right), s = 0, \ldots, n-1 \qquad \text{Equation 18}$$

$$\Delta\phi = \phi_s - \phi_{s-1} = \frac{2\pi}{n} \qquad \text{Equation 19}$$

where the subscript s is used to represent the individual azimuthal sectors and n represents the number of azimuthal sectors.

The prior art technique of binning sensor data into the above-described azimuthal sectors may be closely approximated mathematically by the following expression.

$$\tilde{F}_s = \tilde{F}(\phi_s) = \frac{1}{\Delta\phi}\int_{(\phi_s-\Delta\phi/2)}^{(\phi_s+\Delta\phi/2)} F(\phi)\,d\phi \qquad \text{Equation 20}$$

where $\tilde{F}_s$ and $\tilde{F}(\phi_s)$ represent the average value of the sensor data stored in a particular azimuthal sector (or bin), the subscript s (as described above) is used to represent the individual azimuthal sectors, $\phi_s$ and $\Delta\phi$ represent the azimuthal angle and subtended circular angle, respectively, of each azimuthal sector, and F(φ), as described above, represents a mathematical function of the measured borehole parameter with respect to the azimuth φ. Thus, for example, the average value of the measured sensor data stored in bin s=0, $\tilde{F}_0$, may be described as being approximately equal to the integral of the function F(φ) evaluated from $\phi_0-\Delta\phi/2$ to $\phi_0+\Delta\phi/2$ divided by $\Delta\phi$.

Substituting Equations 3, 18, and 19 into Equation 20 leads to the following mathematical expression:

$$\tilde{F}_s = \sum_{v=-\infty}^{+\infty} (-1)^v f_v \exp\left(\frac{i2\pi v(s+1)}{n}\right)\text{sinc}\left(\frac{\pi v}{n}\right), \qquad \text{Equation 21}$$

$$s = 0, \ldots, n-1$$

where, as described above, the subscript s is used to represent the individual azimuthal sectors, n represents the number of azimuthal sectors, $\tilde{F}_s$ represents the average value of the sensor data stored in azimuthal sector s, and $f_v$ represents the Fourier coefficients. Additionally, sinc(x)=sin(x)/x such that:

$$\text{sinc}\left(\frac{\pi v}{n}\right) = \frac{n\sin\left(\frac{\pi v}{n}\right)}{\pi v} \qquad \text{Equation 22}$$

As shown, Equation 21 includes a set of n simultaneous equations having an infinite number of unknowns, namely Fourier coefficients, $f_v$. As described above (and as shown in Equations 3 and 4), the function of interest, F(φ), may be determined from the Fourier coefficients, $f_v$. Thus, the function F(φ) may be determined from the binned data, $\tilde{F}_s$, to the extent that the Fourier coefficients, $f_v$, may be determined from Equation 21. Given that Equation 21 includes an infinite number of Fourier coefficients, $f_v$, their direct determination is not possible from the binned data, $\tilde{F}_s$. In order to estimate F(φ) from the binned data, $\tilde{F}_s$, it is necessary to truncate the set of equations given in Equation 21 and solve for a limited number of unknowns (e.g., the lower order Fourier coefficients). For example, such a truncated set of Equations may be expressed mathematically, for example, as follows:

$$\tilde{F}_s = \sum_{v=-(n-1)/2}^{+(n-1)/2} (-1)^v \hat{f}_v \exp\left(\frac{i2\pi v(s+1)}{n}\right)\text{sinc}\left(\frac{\pi v}{n}\right), \qquad \text{Equation 23}$$

$$s = 0, \ldots, n-1$$

where n, s, and $\tilde{F}_s$ are as described above with respect to Equation 21, and $\hat{f}_v$ represents approximations to the Fourier coefficients, $f_v$. The $\hat{f}_v$ values may then be utilized to approximate F(φ) as described above in Equations 3 and 4.

It will be appreciated that the Fourier coefficients, $f_v$, in Equation 21 are multiplied by a factor proportional to 1/v (as shown in Equation 22). As such, the higher order Fourier coefficients (such as v=7, 8, 9 . . . ) tend to be weighted significantly and in turn adversely affect an accurate determination of the lower order Fourier coefficients of F(φ). Thus, image distortion caused by prior art binning techniques tends to be significant and often results in poor quality images. The above-described image distortion (which results mathematically from under-sampling a discrete Fourier Series) is typically referred to as aliasing by those of skill in the digital signal processing arts. As shown and described above, such an aliasing effect (as caused by prior art binning techniques) tends to result in distorted (e.g., coarse and grainy) images. While the image distortion caused by aliasing may be reduced via increasing the number of azimuthal sectors (bins), such an approach is typically limited by downhole data storage and/or communication bandwidth constraints. Furthermore, improvements in image quality achievable via simply increasing the number of azimuthal sectors is limited since the Fourier coefficients $f_v$, in Equation 21 are multiplied by a factor proportional to 1/v.

It will also be appreciated that prior art binning techniques do little to reduce measurement noise (with the exception of averaging the sensor data in each azimuthal sector). As is well known to those of ordinary skill, downhole measurements (and in particular azimuthally sensitive measurements) may include statistical variations and significant measurement noise (due in part to the extreme downhole environment), which often reduces the quality of borehole images. As such, reduction of measurement noise may advantageously improve the quality and utility of borehole images.

In contrast to the prior art binning techniques, and as described above, exemplary embodiments of this invention include convolving sensor data with a window function. As will now be shown, embodiments of this invention advantageously reduce image distortion caused by both aliasing effects and measurement noise. This may be shown, for example, by substituting the Bartlett window function given in Equation 9 into Equation 7 and setting x equal to 2, which yields:

$$\tilde{F}_k = \sum_{v=-\infty}^{+\infty} (-1)^v f_v \exp\left(\frac{i2\pi v(k+1)}{p}\right) \text{sinc}^2\left(\frac{\pi v}{p}\right), \quad \text{Equation 24}$$

$$k = 0, \ldots, p-1$$

where, as described above, the subscript k is used to represent the individual azimuthal positions, and p represents the number of azimuthal positions for which convolved logging sensor data is determined. Additionally, $\tilde{F}_k$ represents the convolved sensor data stored at each azimuthal position k, $f_v$ represents the Fourier coefficients, and sinc(x)=sin(x)/x such that:

$$\text{sinc}^2\left(\frac{\pi v}{p}\right) = \frac{p^2 \sin^2\left(\frac{\pi v}{p}\right)}{\pi^2 v^2} \quad \text{Equation 25}$$

It will be appreciated that Equation 24 is similar to Equation 21 in that it includes a set of simultaneous equations having an infinite number of unknowns. Thus, as described above with respect to Equation 21, it is possible to estimate F(φ) from the convolved sensor data $\tilde{F}_k$ by truncating the set of equations given in Equation 24 and solving for the lower order Fourier coefficients. However, it will also be appreciated that Equation 24 converges more rapidly than Equation 21 since it includes the factor sinc$^2$(πv/p). As such the Fourier coefficients, $f_v$, in Equation 24 are multiplied by a factor proportional to 1/v$^2$ (as shown in Equation 25). Thus, in contrast to the prior art binning techniques, truncating the set of equations in Equation 24 tends not to introduce significant aliasing errors since the higher order Fourier coefficients tend not to contribute significantly to an accurate determination of F(φ). As such, exemplary embodiments of this invention, in which the sensor data is convolved with a window function (such as one of the symmetrical tapered window functions described above), are shown to advantageously significantly reduce aliasing effects as compared to the prior art binning techniques.

Evaluating the convolution of the sensor data with a window function at p'=2p azimuthal positions, for example, may enable the imaging system to reduce the effects of statistical measurement noise in addition to reducing aliasing effects. As such, the convolution is evaluated such that $\phi_k - \phi_{k-1} = \pi/p = (\phi_s - \phi_{s-1})/2$, where $\phi_s$ is defined in Equation 18. Substituting the Bartlett window function given in Equation 9 into Equation 7 and setting x equal to 2 yields:

$$\tilde{F}_k = \sum_{v=-\infty}^{+\infty} (-1)^v f_v \exp\left(\frac{i\pi v(k+1)}{p}\right) \text{sinc}^2\left(\frac{\pi v}{2p}\right), \quad \text{Equation 26}$$

$$k = 0, \ldots, 2p-1$$

where k, p, $\tilde{F}_k$, and $f_v$ are as described above with respect to Equation 24.

Equation 26 is substantially identical to Equation 24 with the exception that it includes p'=2p equations, rather than p equations. The system of equations shown in Equation 26 is essentially over determined (i.e., includes more equations than unknowns) when truncated analogously to the system of equations shown in Equation 23. As such, the effect of statistical measurement noise on the estimate of the Fourier coefficients, $f_v$ (and therefore F(φ), tends to be reduced as compared to prior art binning techniques. In addition, aliasing effects are also reduced by the sinc$^2$(πv/(2p)) factor as described above with respect to Equation 24. It will be appreciated that Equation 26 may also be truncated such that it includes a greater number of terms (since it includes 2p rather than p equations), thereby enabling aliasing effects to be even further reduced as compared to the prior art.

It will be appreciated that exemplary embodiments of this invention may be advantageously utilized to determine a formation (or borehole) parameter at substantially any arbitrary azimuth. For example, Fourier coefficients of the azimuthal dependence a formation parameter may be estimated as described above with respect to Equations 24 or 26. A Fourier series including at least one Fourier coefficient may then be utilized to determine a value of the formation parameter at substantially any azimuth φ. The Fourier coefficient(s) may also be utilized to estimate F(φ) as described above with respect to Equations 3 and 4.

In the preceding examples, a Bartlett window function is utilized to demonstrate that exemplary embodiments of this invention tend to advantageously reduce aliasing effects and the effect of statistical measurement noise as compared to prior art binning techniques. Moreover, embodiments of this invention advantageously enable such aliasing effects to be decoupled from statistical measurement noise and therefore, as described above, may be advantageously utilized in LWD imaging applications. It will be appreciated that this invention is not limited in any way by such examples, but rather, as described above may include the use of substantially any window function having substantially any azimuthal breadth.

It will be understood that the aspects and features of the present invention may be embodied as logic that may be processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MWD/LWD sub. Alternatively the processing system may be at the surface and configured to process data sent to the surface by sensor sets via a telemetry or data link system also well known in the art. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

I claim:

1. A method for estimating an azimuthal dependence of a parameter of a borehole using logging sensor measurements acquired as a function of azimuth of said logging sensors, the method comprising:

(a) rotating a downhole tool in a borehole, the tool including at least one logging sensor and at least one azimuth sensor, data from the logging sensor being operable to assist determination of a parameter of the borehole;

(b) causing the at least one logging sensor and the at least one azimuth sensor to acquire at least one data pair, each data pair comprising a logging sensor measurement and a corresponding azimuth;

(c) processing a convolution of selected data pairs with a predetermined window function to determine convolved logging sensor data for at least one azimuthal position.

2. The method of claim 1, wherein the window function comprises a rectangular window function.

3. The method of claim 2, wherein the rectangular window function is expressed mathematically as follows:

$$W(\phi) = \begin{cases} 2\pi p, & |\phi| < \frac{x\pi}{p} \\ 0, & \frac{x\pi}{p} \leq \phi < \pi \\ 0, & -\pi \leq \phi \leq -\frac{x\pi}{p} \end{cases};$$

wherein $W(\phi)$ represents the rectangular window function, p represents the number of the azimuthal positions for which convolved logging sensor data is determined, $\phi$ represents azimuth, and x represents a factor controlling an azimuthal breadth of the window function.

4. The method of claim 1, wherein the window function is tapered and symmetrical about the at least one azimuthal position.

5. The method of claim 4, wherein the window function is selected from the group consisting of Bartlett, Blackman, Gaussian, Hanning, Hamming, and Kaiser functions.

6. The method of claim 4, wherein the window function is expressed mathematically by an equation selected from the group consisting of:

$$W(\phi) = \begin{cases} 2\pi p\left(1 - \frac{p|\phi|}{x\pi}\right), & |\phi| < \frac{x\pi}{p} \\ 0, & \frac{x\pi}{p} \leq \phi < \pi \\ 0, & -\pi \leq \phi \leq -\frac{x\pi}{p} \end{cases}; \quad (1)$$

$$W(\phi) = \begin{cases} 2\pi p\left[0.42 + 0.5\cos\left(\frac{p\phi}{x}\right) + 0.08\cos\left(2\frac{p\phi}{x}\right)\right], & |\phi| < \frac{x\pi}{p} \\ 0, & \frac{x\pi}{p} \leq \phi < \pi \\ 0, & -\pi \leq \phi \leq -\frac{x\pi}{p} \end{cases}; \quad (2)$$

$$W(\phi) = \begin{cases} \exp\left(-\alpha_a\left(\frac{p\phi}{x\pi}\right)^2\right), & |\phi| < \frac{x\pi}{p} \\ 0, & \frac{x\pi}{p} \leq \phi < \pi \\ 0, & -\pi \leq \phi \leq -\frac{x\pi}{p} \end{cases}; \quad (3)$$

$$W(\phi) = \begin{cases} \pi p\left(1 + \cos\left(\frac{p\phi}{x}\right)\right), & |\phi| < \frac{x\pi}{p} \\ 0, & \frac{x\pi}{p} \leq \phi < \pi \\ 0, & -\pi \leq \phi \leq -\frac{x\pi}{p} \end{cases}; \quad (4)$$

$$W(\phi) = \begin{cases} 2\pi p\left[0.54 + 0.46\cos\left(\frac{p\phi}{x}\right)\right], & |\phi| < \frac{x\pi}{p} \\ 0, & \frac{x\pi}{p} \leq \phi < \pi \\ 0, & -\pi \leq \phi \leq -\frac{x\pi}{p} \end{cases}; \text{ and} \quad (5)$$

$$W(\phi) = \begin{cases} \dfrac{I_0\left(\omega_a\sqrt{1 - \left(\frac{p\phi}{x\pi}\right)^2}\right)}{I_0(\omega_a)}, & |\phi| < \frac{x\pi}{p} \\ 0, & \frac{x\pi}{p} \leq \phi < \pi \\ 0, & -\pi \leq \phi \leq -\frac{x\pi}{p} \end{cases}; \quad (6)$$

wherein $W(\phi)$ represents the window function, p represents the number of the azimuthal positions for which convolved logging sensor data is determined, $\phi$ represents azimuth, x and $\omega_a$ and $\alpha_a$ represent factors controlling an azimuthal breadth of the window function, and $I_0$ represents a zero order modified Bessel function of the first kind.

7. The method of claim 1, further comprising:

(d) processing the convolved logging sensor data determined in (c) to determine at least one Fourier coefficient of the azimuthal dependence of the parameter.

8. The method of claim 7, further comprising:

(e) processing the at least one Fourier coefficient of the azimuthal dependence of the parameter determined in (d) to estimate a value of the parameter at an arbitrary azimuth.

9. The method of claim 1, wherein the logging sensor is selected from the group consisting of a natural gamma ray sensor, a neutron sensor, a density sensor, a resistivity sensor, a formation pressure sensor, an annular pressure sensor, an ultrasonic sensor, and an audio-frequency acoustic sensor.

10. The method claim 1, wherein the parameter of the borehole is selected from the group consisting of formation density, formation resistivity, formation acoustic velocity, gamma ray interaction cross section, and neutron interaction cross section.

11. The method of claim 1, wherein the tool is coupled to a drill string.

12. The method of claim 1, wherein the tool further comprises a logging while drilling tool.

13. The method of claim 1, wherein the tool further comprises a controller, the controller disposed to cause the at least one logging sensor and the at least one azimuth sensor to acquire the plurality of data pairs in (b), the controller further disposed to determine the convolved logging sensor data in (c).

14. The method of claim 1, wherein the at least one logging sensor and the at least one azimuth sensor acquire the plurality of data pairs in (b) during rotation of the tool in (a).

15. The method of claim 1, wherein (b) further comprises causing the at least one logging sensor and the at least one azimuth sensor to acquire a plurality of data pairs during predetermined first and second time periods.

16. The method of claim 15, further comprising:
   (d) assigning corresponding first and second borehole depth values to the convolved logging sensor data determined in (c) using data pairs acquired during the first and second time periods.

17. The method of claim 1, wherein a plurality of azimuthal positions in (c) are substantially evenly distributed about a circular horizon.

18. A method for forming an image of a parameter of a borehole using logging sensor measurements acquired as a function of azimuth of said logging sensors, the method comprising:
   (a) rotating a downhole tool at a first longitudinal position in the borehole, the tool including at least one logging sensor and at least one azimuth sensor, data from the logging sensor being operable to assist determination of a parameter of the borehole;
   (b) causing the at least one logging sensor and the at least one azimuth sensor to acquire at least one data pair, each data pair comprising a logging sensor measurement and a corresponding azimuth;
   (c) processing a convolution of selected data pairs with a predetermined window function to determine convolved logging sensor data for at least one azimuthal position;
   (d) repositioning the downhole tool and rotating it at a second longitudinal position in the borehole and repeating (b) and (c).

19. The method of claim 18, further comprising:
   (e) transmitting the convolved sensor data determined in (c) and (d) uphole.

20. The method of claim 18, further comprising:
   (e) assigning a first depth value to the convolved sensor data determined in (c) and a second depth value to the convolved sensor data determined in (d).

21. The method of claim 18, wherein the window function comprises a rectangular window function.

22. The method of claim 18, wherein the window function is tapered and symmetrical about the at least one azimuthal position.

23. The method of claim 18, wherein the window function is selected from the group consisting of Bartlett, Blackman, Gaussian, Hanning, Hamming, and Kaiser functions.

24. The method of claim 18, further comprising:
   (e) processing the convolved sensor data determined in (c) and (d) to determine at least one Fourier coefficient of an azimuthal dependence of the parameter.

25. The method of claim 24, further comprising:
   (f) processing the at least one Fourier coefficient of the azimuthal dependence of the parameter determined in (e) to estimate a value of the parameter at an arbitrary azimuth.

26. The method of claim 18, wherein the logging sensor is selected from the group consisting of a natural gamma ray sensor, a neutron sensor, a density sensor, a resistivity sensor, a formation pressure sensor, an annular pressure sensor, an ultrasonic sensor, and an audio-frequency acoustic sensor.

27. The method claim 18, wherein the parameter of the borehole is selected from the group consisting of formation density, formation resistivity, formation acoustic velocity, gamma ray interaction cross section, and neutron interaction cross section.

28. The method of claim 18, wherein the tool is coupled to a drill string.

29. The method of claim 18, wherein the downhole tool further comprises a logging while drilling tool.

30. A system for estimating an azimuthal dependence of a parameter of a borehole using logging sensor measurements acquired as a function of azimuth of said logging sensors, the system comprising:
   a downhole tool including at least one logging sensor and at least one azimuth sensor, data from the logging tool being operable to assist determination of a parameter of the borehole, the downhole tool further including a controller disposed to convolve logging sensor data with a predetermined window function, the downhole tool operable to be coupled to a drill string and rotated in a borehole;
   the controller configured to:
   (A) cause the at least one logging sensor and the at least one azimuth sensor to acquire at least one data pair, each data pair comprising a logging sensor measurement and a corresponding azimuth; and
   (B) process a convolution of selected data pairs with a predetermined window function to determine convolved logging sensor data for at least one azimuthal position.

31. The system of claim 30, wherein the window function is expressed mathematically by an equation selected from the group consisting of:

$$W(\phi) = \begin{cases} 2\pi p, & |\phi| < \dfrac{x\pi}{p} \\ 0, & \dfrac{x\pi}{p} \leq \phi < \pi \\ 0, & -\pi \leq \phi \leq -\dfrac{x\pi}{p} \end{cases} \quad (1)$$

$$W(\phi) = \begin{cases} 2\pi p\left(1 - \dfrac{p|\phi|}{x\pi}\right), & |\phi| < \dfrac{x\pi}{p} \\ 0, & \dfrac{x\pi}{p} \leq \phi < \pi \\ 0, & -\pi \leq \phi \leq -\dfrac{x\pi}{p} \end{cases} \quad (2)$$

$$W(\phi) = \begin{cases} 2\pi p\left[0.42 + 0.5\cos\left(\dfrac{p\phi}{x}\right) + 0.08\cos\left(2\dfrac{p\phi}{x}\right)\right], & |\phi| < \dfrac{x\pi}{p} \\ 0, & \dfrac{x\pi}{p} \leq \phi < \pi \\ 0, & -\pi \leq \phi \leq -\dfrac{x\pi}{p} \end{cases} \quad (3)$$

-continued $$W(\phi) = \begin{cases} \exp\left(-\alpha_a\left(\frac{p\phi}{x\pi}\right)^2\right), & |\phi| < \frac{x\pi}{p} \\ 0, & \frac{x\pi}{p} \le \phi < \pi \\ 0, & -\pi \le \phi \le -\frac{x\pi}{p} \end{cases};$$ (4)

$$W(\phi) = \begin{cases} \pi p\left(1 + \cos\left(\frac{p\phi}{x}\right)\right), & |\phi| < \frac{x\pi}{p} \\ 0, & \frac{x\pi}{p} \le \phi < \pi \\ 0, & -\pi \le \phi \le -\frac{x\pi}{p} \end{cases};$$ (5)

$$W(\phi) = \begin{cases} 2\pi p\left[0.54 + 0.46 \cos\left(\frac{p\phi}{x}\right)\right], & |\phi| < \frac{x\pi}{p} \\ 0, & \frac{x\pi}{p} \le \phi < \pi \\ 0, & -\pi \le \phi \le -\frac{x\pi}{p} \end{cases};$$ and (6)

$$W(\phi) = \begin{cases} \frac{I_0\left(\omega_a\sqrt{1-\left(\frac{p\phi}{x\pi}\right)^2}\right)}{I_0(\omega_a)}, & |\phi| < \frac{x\pi}{p} \\ 0, & \frac{x\pi}{p} \le \phi < \pi \\ 0, & -\pi \le \phi \le -\frac{x\pi}{p} \end{cases};$$ (7)

wherein $W(\phi)$ represents the window function, p represents the number of the azimuthal positions for which convolved logging sensor data is determined, $\phi$ represents azimuth, x and $\omega_a$ and $\alpha_a$ represent factors controlling an azimuthal breadth of the window function, and $I_0$ represents a zero order modified Bessel function of the first kind.

32. A computer readable medium storing a software program, the software program configured to enable a processor to perform a method for estimating an azimuthal dependence of a parameter of a borehole using logging sensor measurements acquired as a function of azimuth of said logging sensors, the method comprising:

(a) causing at least one logging sensor and at least one azimuth sensor deployed on a downhole tool to acquire at least one data pair, each data pair comprising a logging sensor measurement and a corresponding azimuth;

(b) processing a convolution of selected data pairs with a predetermined window function to determine convolved logging sensor data for at least one azimuthal position.

33. The computer readable medium of claim 32, wherein the window function is tapered and symmetrical about the at least one azimuthal position.

34. The computer readable medium of claim 32, wherein the window function is selected from the group consisting of rectangular, Bartlett, Blackman, Gaussian, Hanning, Hamming, and Kaiser functions.

35. The computer readable medium of claim 32, wherein (a) further comprises causing the at least one logging sensor and the at least one azimuth sensor to acquire at least one data pair during predetermined first and second time periods.

36. The computer readable medium of claim 35, wherein the method further comprises:

(c) assigning corresponding first and second borehole depth values to the convolved logging sensor data determined in (b) using data pairs acquired during the first and second time periods.

37. The computer readable medium of claim 32, wherein the method further comprises:

(c) processing the convolved logging sensor data determined in (b) to determine at least one Fourier coefficient of the azimuthal dependence of the parameter.

38. The computer readable medium of claim 37, wherein the method further comprises:

(d) processing the at least one Fourier coefficient of the azimuthal dependence of the parameter determined in (c) to estimate a value of the parameter at an arbitrary azimuth.

* * * * *